(12) United States Patent
Richards (10) Patent No.: US 8,480,234 B2
(45) Date of Patent: Jul. 9, 2013

(54) METHOD AND APPARATUS FOR LIGHT RECAPTURE AND SEQUENTIAL CHANNEL ILLUMINATION

(75) Inventor: Martin Richards, Redwood City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 13/569,374

(22) Filed: Aug. 8, 2012

(65) Prior Publication Data

US 2012/0300175 A1 Nov. 29, 2012

Related U.S. Application Data

(62) Division of application No. 12/141,351, filed on Jun. 18, 2008, now abandoned.

(51) Int. Cl.
*G02B 27/22* (2006.01)
*G02B 5/22* (2006.01)
*G03B 21/28* (2006.01)
*H04N 15/00* (2006.01)
*H04N 13/04* (2006.01)

(52) U.S. Cl.
USPC .................... 353/7; 353/84; 348/60; 359/891

(58) Field of Classification Search
USPC .................. 353/7, 84, 30, 31; 352/57, 60, 62, 352/63; 348/51, 54, 60; 349/15; 359/885–892
See application file for complete search history.

(56) References Cited

U.S. PATENT DOCUMENTS

| | | | | |
|---|---|---|---|---|
| 2,596,129 | A * | 5/1952 | Cristiani | 352/60 |
| 4,692,792 | A * | 9/1987 | Street | 348/56 |
| 4,934,824 | A * | 6/1990 | Ling | 352/57 |
| 4,963,015 | A * | 10/1990 | Ling | 352/57 |
| 5,361,106 | A * | 11/1994 | Ashbey | 352/57 |
| 6,283,597 | B1 * | 9/2001 | Jorke | 353/31 |
| 6,591,022 | B2 | 7/2003 | Dewald | |
| 7,357,510 | B2 * | 4/2008 | Kim et al. | 353/7 |
| 7,542,206 | B2 * | 6/2009 | Schuck et al. | 359/489.08 |
| 7,784,938 | B2 * | 8/2010 | Richards et al. | 351/159.65 |
| 7,832,869 | B2 * | 11/2010 | Maximus et al. | 353/7 |
| 7,959,295 | B2 | 6/2011 | Richards | |
| 7,982,954 | B2 * | 7/2011 | Schuck et al. | 359/489.07 |
| 2002/0057402 | A1 | 5/2002 | Um | |
| 2003/0197837 | A1 * | 10/2003 | Gyu Lee | 353/84 |
| 2003/0218726 | A1 * | 11/2003 | Huibers | 353/84 |
| 2005/0007305 | A1 | 1/2005 | Johansen | |

(Continued)

FOREIGN PATENT DOCUMENTS

| | | |
|---|---|---|
| DE | 10359788 | 4/2005 |
| EP | 1830584 | 9/2007 |
| WO | 2008/140787 | 11/2008 |

*Primary Examiner* — John Lee (57) ABSTRACT

A filter wheel having spirally shaped left and right channel 3D filters. The 3D filters are, for example, spectral separation filters. The filter is mounted, for example, close to an integrating rod output of a projector. The left and right channel filtered light scrolls across a modulation device which is energized with correspondingly scrolling left and right image data. In one embodiment, the integrating rod comprises mirrored surfaces to facilitate recycling of light reflected off the filter wheel. The filter wheel may be placed in a single or dual projector configuration. In one embodiment, the filters are fixed at the end of an integrating rod using "re-cycled" light to illuminate different channels of a projection system.

20 Claims, 10 Drawing Sheets

U.S. PATENT DOCUMENTS

| | | | |
|---|---|---|---|
| 2005/0185148 A1* | 8/2005 | Davis et al. | 353/84 |
| 2005/0237487 A1* | 10/2005 | Chang | 353/7 |
| 2005/0254017 A1* | 11/2005 | Huibers | 353/84 |
| 2006/0012753 A1* | 1/2006 | Gandara et al. | 353/7 |
| 2006/0038964 A1* | 2/2006 | Lu et al. | 353/84 |
| 2006/0132722 A1* | 6/2006 | Colpaert | 353/84 |
| 2006/0227300 A1* | 10/2006 | Drazic et al. | 353/84 |
| 2007/0127121 A1* | 6/2007 | Maximus et al. | 359/465 |
| 2007/0236617 A1* | 10/2007 | Lippey | 349/5 |
| 2007/0236809 A1* | 10/2007 | Lippey et al. | 359/722 |
| 2008/0018861 A1* | 1/2008 | Schuck et al. | 353/20 |
| 2008/0018999 A1* | 1/2008 | Schuck et al. | 359/495 |
| 2008/0174868 A1* | 7/2008 | Schuck et al. | 359/487 |
| 2008/0278807 A1* | 11/2008 | Richards et al. | 359/464 |
| 2008/0284982 A1* | 11/2008 | Richards et al. | 352/38 |
| 2009/0316114 A1* | 12/2009 | Richards | 353/7 |
| 2010/0013911 A1* | 1/2010 | Jacobs et al. | 348/54 |
| 2010/0060857 A1* | 3/2010 | Richards et al. | 353/7 |
| 2011/0187715 A1* | 8/2011 | Jacobs et al. | 345/426 |
| 2011/0205494 A1* | 8/2011 | Richards et al. | 353/7 |

* cited by examiner

METHOD AND APPARATUS FOR LIGHT RECAPTURE AND SEQUENTIAL CHANNEL ILLUMINATION

CROSS REFERENCE TO RELATED APPLICATIONS

This application is a divisional of U.S. patent application Ser. No. 12/141,351 filed on Jun. 18, 2008, hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to light recapture systems and particularly to light recapture in projection systems.

2. Description of the Related Art

Various methods are in place for 3D stereoscopic projection, including Anaglyph, Linear Polarization, Circular Polarization, Shutter Glasses, and Spectral Separation. Anaglyph is the oldest technology, and provides left/right eye separation by filtering the light through a two color filter, commonly red for one eye, and cyan for the other eye. At the projector, the left eye image is (commonly) filtered through a red filter, and the right image filtered through a cyan filter. The eyewear consists of a red filter for the left eye, and a cyan filter for the right eye. This method works best for black and white original images, and is not well suited for color images.

Linear Polarization 3D provides separation at the projector by filtering the left eye through a linear polarizer (commonly) oriented vertically and filtering the right eye image through a linear polarizer oriented horizontally. The eyewear consists of a vertically oriented linear polarizer for the left eye and a horizontally oriented polarizer for the right eye. The projection screen must be of the polarization preserving type, commonly referred to as a "silver screen" because of its distinctive color. Linear Polarization allows a full color image to be displayed with little color distortion. It has several problems, these include the need for a silver screen which is expensive, fragile, and not uniform. Another problem is that the viewer must keep his head oriented vertically to avoid crosstalk from one eye to another.

Circular Polarization 3D was invented to address the problem of requiring the viewer to keep his head oriented vertically. Circular Polarization provides separation at the projector by filtering the left eye image through a (commonly) left handed circular polarizer, and filtering the right eye image through a right handed circular polarizer. The eyewear consists of a left handed circular polarizer for the left eye and a right handed circular polarizer for the right eye. A silver screen is also needed for this approach.

Shutter Glasses provides separation by multiplexing the left and right images in time. A filter for separation at the projector is not required. The eyewear consists of active glasses that electronically shutter the lens in synchrony with the projector frame rate. The left eye image is first displayed, followed by the right eye image etc. Since having a direct wired connection to the Glasses in a theatre is impractical, a wireless or infrared signaling method is used to provide a timing reference for the left/right eye shuttering.

Spectral Separation provides separation at the projector by filtering the left and right eye spectrally. The system differs from anaglyph in that the filters for the left and right eye each pass a portion of the red, green, and blue spectrum, providing for a full color image. The band pass spectrum of the left eye filter is complementary to the band pass spectrum of the right eye filter. The eyewear consists of filters with the same general spectral characteristics as are used in the projector. While this method provides a full color image, it requires color compensation to make the colors in the left and right eye match the colors that were present in the original image, and there is a small reduction in the color gamut compared to the gamut of the projector.

The projectors themselves take on various forms, including LCD (liquid crystal display) projectors which usually contain three separate LCD glass panels, one each primary color component of a image to be projected. The LCD panels modulate the light and produces the image that is projected onto the screen.

DLP ("Digital Light Processing") is a proprietary technology developed by Texas Instruments. The DLP chip is a reflective surface made up of thousands of tiny mirrors. In expensive DLP projectors, there are three separate DLP chips, one for each for the red, green, and blue channels. Typically, a prism separates light from a projection lamp into red, green, and blue colored light which then separately illuminate "red," "green," and "blue" DLP chips which modulate the primary colored lights according to the corresponding primary color components of an image signal. After modulation, the now modulated primary colored lights are recombined and projected onto a viewing screen.

Other, and less expensive, applications of DLP include projectors with a single DLP chip used in conjunction with a color wheel that consists of red, green, blue, and sometimes white (clear) filters. The color wheel spins between a projection lamp and the DLP chip—alternating the color of the light illuminating the chip. The alternating colors of the light illuminating the DLP chip are modulated and projected on a viewing screen in sequence. The sequentially modulated and projected lights then form a full color image when viewed.

The single chip DLP projector described has a lack of efficiency which has been partially addressed through light re-capture and the use of "scrolling color" across the DLP chip. Such techniques are described, for example, in D. Scott Dewald, "*Sequential Color Recapture and Dynamic Filtering: A Method of Scrolling Color,*" SID 00 DIGEST, and Dewald, U.S. patent application Ser. No. 10/028,023.

SUMMARY OF THE INVENTION

The present inventor has realized the need to increase brightness efficiency in high quality multi-chip projectors, such as D-Cinema projectors, particularly when projecting multi-channel images such as 3D cinema or displays (e.g., rear projection televisions, front projectors, medical diagnostic display devices, etc).

In one embodiment, the present invention provides a filter (e.g., a filter wheel) comprising spirally shaped filters configured for use in left and right channels of a 3D projection system. The spirally shaped filters are, for example, rotated so that the portions of filtered light from each spiral "scroll" across modulators (e.g., DLP modulators).

In one embodiment, the filters comprise, for example, spectral separation filters. The filters may also comprise a set of first channel passbands configured to pass light, a set of second channel passbands configured to pass light, and a set of guard bands configured to block light between adjacent passbands of different channels. The filters may comprise at least one notch band between adjacent colors of a same channel configured to block light between the adjacent colors.

In one embodiment, at least one of the spectral separation filters comprises three passbands of visible light, a first passband configured to pass only a first color of light, a second passband configured to pass two spectrum adjacent colors of light comprising the first color of light and a second color of light, and a third passband configured to pass two spectrum adjacent colors of light comprising the second color of light and a third color of light. In one embodiment, at least one of the passbands passing spectrum adjacent colors of light includes a notch band that separates the spectrum adjacent colors and is not passed by the passband.

In one embodiment, the spectral separation filters comprise at least one filter having passbands of wavelengths of approximately 400 to 440 nm, 484 to 498 nm, 514 to 528 nm, 567 to 581 nm, and 610 to 623 nm. In one embodiment, the spectral separation filters comprise at least one filter having passbands of wavelengths of approximately 455 to 471 nm, 539 to 556 nm, and 634 to 700 nm.

The present invention includes a method, comprising the steps of, illuminating a first portion of a light modulator with light having characteristics of a first channel of a 3D image, and illuminating a second portion of the light modulator with light having characteristics of a second channel of a 3D image, wherein the step of illuminating the first portion of the light modulator and the step of illuminating the second portion of the light modulator are performed simultaneously. The step of illuminating may comprise, for example, spinning spirally shaped filters in a light path of a projector. The spirally shaped filters may comprise, for example, spectral separation filters each including at least one set of primary passbands. The method may also comprise, for example, a step of re-cycling reflections from the spirally shaped filters.

The present invention includes various embodiments of projectors, including, for example, a projector comprising a filter wheel comprising at least one set of spectrally separated spirally shaped filters. The projector may further comprise, for example, an integrating rod positioned between the filter wheel and a light source, wherein the integrating rod comprises a mirror configured to reflect portions of light not passed by a first of the spectrally separated filters and portions of light not passed by the second set of spectrally separated filters back toward the filters. The projector may further comprise, for example, light modulators positioned to simultaneously intercept light filtered by both of at least one set of the spectrally separated spirally shaped filters. The projector may yet further comprise, for example, light modulators positioned to simultaneously intercept light filtered by more than at least one set of the spectrally separated spirally shaped filters.

The projector (e.g., first projector) may, for example, be part of a system including at least one pair of spectrally separated eye filters. The system may include, for example, a second projector that operates in synchronicity (e.g., inverse synchronicity) with the first projector.

Portions of both the devices and methods of the invention may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
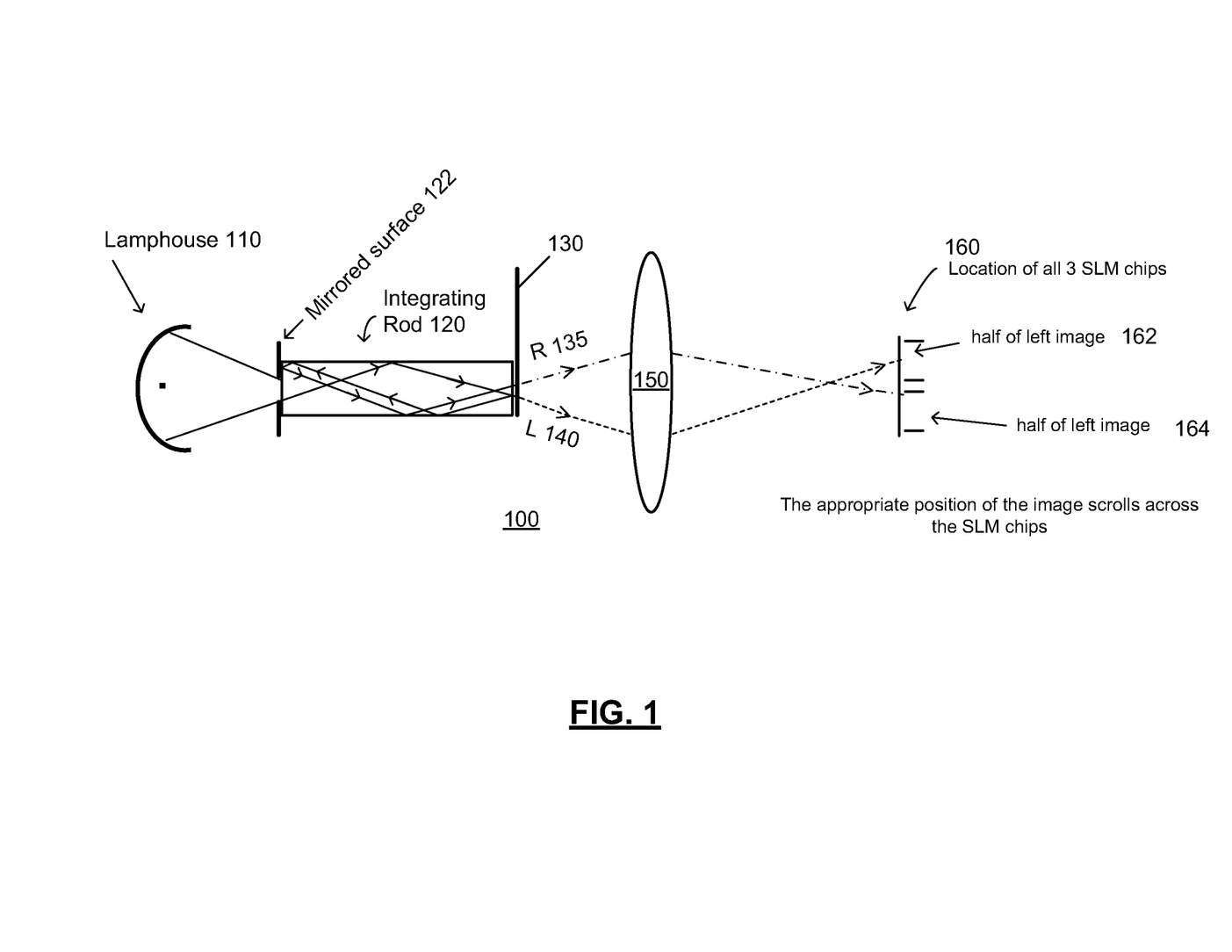
FIG. 1 is an optical schematic according to an embodiment of the present invention.

Referring now to the drawings, wherein like reference numerals designate identical or corresponding parts, and more particularly to FIG. 1 thereof, there is illustrated an optical schematic 100 according to an embodiment of the present invention. The schematic shows a light path from a lamphouse 110 to modulation chips 160 (e.g., 3 Spatial Light Modulator (SLM) Chips), which are, for example, TI DLP's, LCOS, or other modulators. An integrating rod 120 homogenizes light received from the lamphouse 110. A filter 130 (e.g., filter wheel) filters light exiting the integrating rod 120 into a light bundle with separate channels which are, for example, left and right channels of a 3D projection system. Optics 150 direct the filtered light so as to illuminate modulation surfaces of the modulation chips 160.

The filter 130 is located very close to the output of the integrating rod such that light reflected from the wheel re-enters the rod, and such that the wheel is located at an image point for the modulation chips (e.g., DMD/DLP, LCoS, LCD, etc). The integrating rod includes, for example, a reflective surface 122 (e.g., a mirrored surface), which acts to redirect light that either fails to exit the integrating rod or is reflected into the rod from either the filter 130, the modulation chips 160, or any other portion of the light path.

The filter 130, is, for example, a spinning wheel filter that includes filters that pass the left and right channels of a 3D projection system. Light exiting the filter 130 includes, for example, a partial light bundle including beam 135 destined for modulation as part of the right channel and partial light bundle including beam 140 destined for modulation as part of the left channel. As shown, each of the light beams 135 and 140 illuminate different sections of the modulators corresponding to portions of the right and left images, respectively (e.g., ½ left image and ½ right image).

Figure 2:
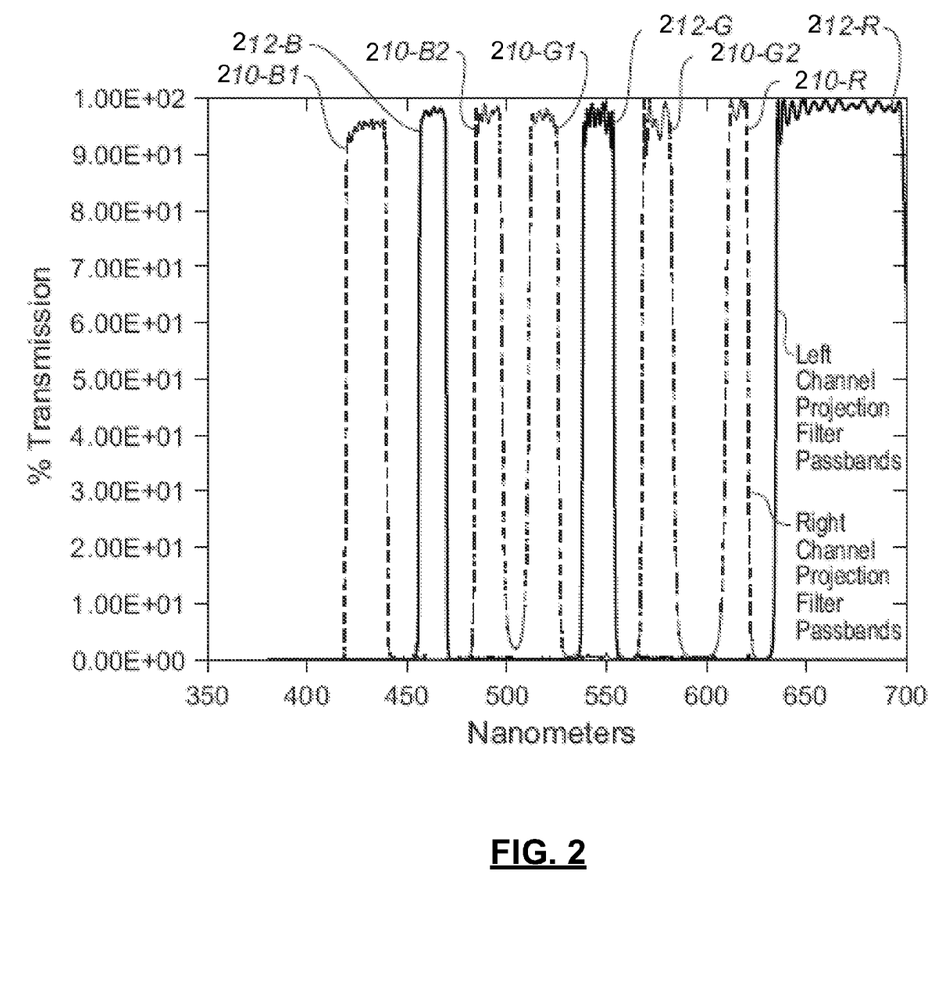
FIG. 2 is a set of exemplary band passes utilized to filter left and right channels according to an embodiment of the present invention.

FIG. 2 is a set of exemplary band passes utilized to filter left and right channels according to an embodiment of the present invention. As shown in FIG. 2, a right channel projection filter has passband wavelengths of blue at 400 to 440 (210-B1) and 484 to 498 nm (210-B2), green at 514 to 528 (210-G1) and 567 to 581 nm (210-G2), and red at 610 to 623 nm (210-R). A left channel projection filter has passband wavelengths of blue at 455 to 471 nm (212-B), green at 539 to 556 nm (212-G), and red at 634 to 700 nm (212-R). Of course other permutations exist, such as, for example, switching the left and right channel wavelengths, or switching the green and blue wavelengths etc. In addition, the passband wavelengths are approximate and each band may vary by, for example +/−5 nm or more. Such variations may occur by shifting the entire passband and/or by selecting one or more different endpoints for the passbands. An important consideration is that such variances should not reduce the guard band between passbands to a level where a system using the filters incurs unacceptable levels of crosstalk between the channels. In sum, the filters include, for example, at least one band in each of red, green, and blue lights for each of the channels. The filters may include more than one band in a same color and same channel. The filters may also include guard bands between adjacent portions of spectrum in different channels. The filters may also include a notch band between adjacent colors in the same channel. A full discussion of similar channel filters in the context of 3D projection systems is provided by Richards et al., U.S. patent application Ser. No. 12/530,379, and Richards et al., U.S. Provisional Patent Application Ser. No. 60/931,320, the contents of each of which are incorporated herein by reference in their entirety.

In designs such as those represented in the above noted patent applications [patents] using a 3D spectral separation filter wheel, the filter wheel is, for example, divided into 2 halves, each half comprising a channel filter. In embodiments of the present invention utilizing a filter wheel, the filter wheel is instead divided into spiral sections (filter 130 is, for example, a multi-segment spiral spectral separation wheel), or sections of other geometric properties (e.g., radial filter sections). The filter 130 is, for example, located at the output of the integrating rod of the projector.

Figure 3A:
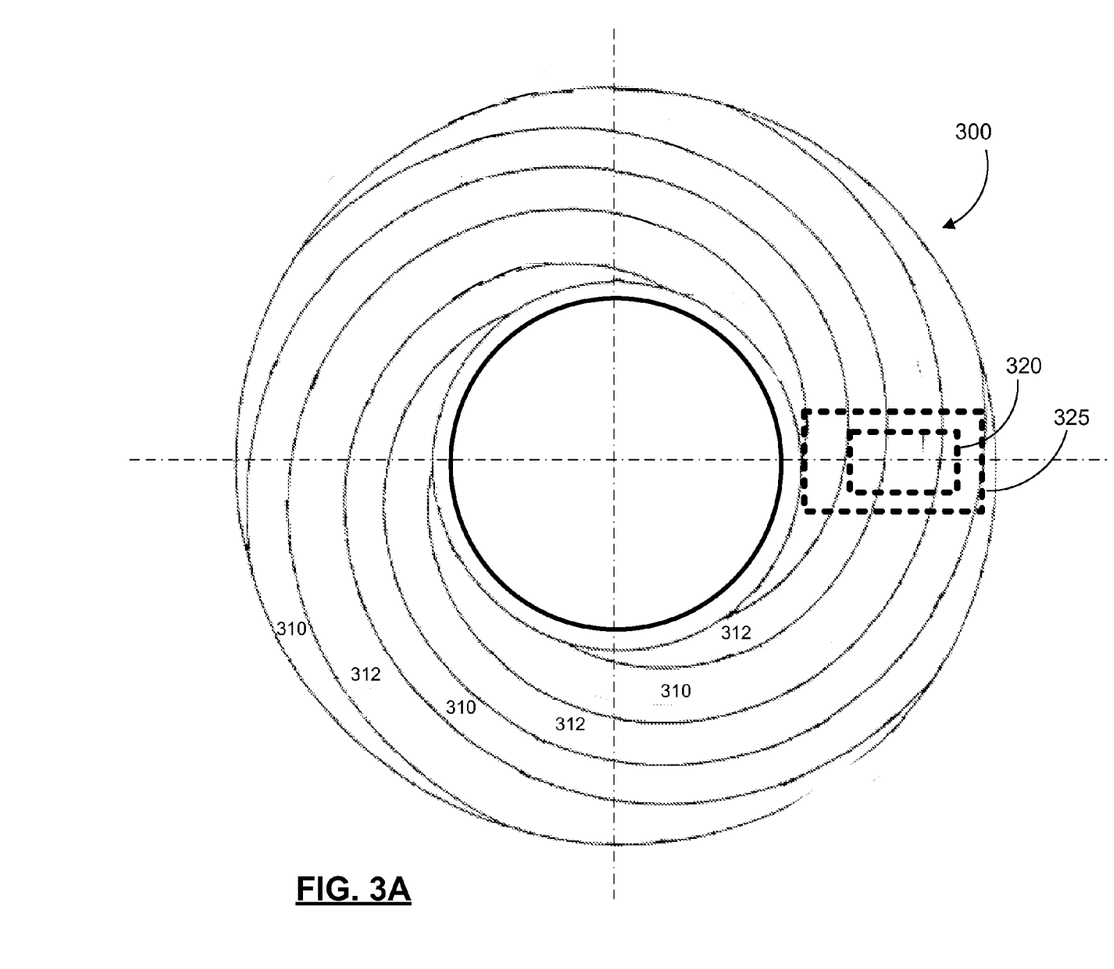
FIG. 3A is a drawing of a multi-segmented spiral spectral separation filer wheel according to an embodiment of the present invention.

FIG. 3A is a drawing of a multi-segmented spiral spectral separation filer wheel 300 according to an embodiment of the present invention. The wheel 300 includes sections 310 (e.g., a right channel filter) having a spectral separation filter (e.g., passbands consistent with, for example, Right Channel Projection Filter Passbands 210-B1, 210-B2, 210-G1, 210-G2, and 210R), and section 312 (e.g., a left channel filter) having a second spectral separation filter (e.g., passbands consistent with, for example, Left Channel Projection Filter Passbands 212-B, 212-G, and 212-R).

FIG. 3A also illustrates an outline of possible sizes and a location of a 16×9 integrating rod output (320 and 325) on the filter wheel 300. Light output from the integrating rod passes through multiple segments of the filter 300 and then illuminates the modulation chips (e.g., the modulation surfaces of the modulation chips) with the multiple segment filtered light. The modulation chip then modulates, in sections, the left and right channel images simultaneously. The sections corresponding to the left and right channel segments of filtered light illuminating the modulation chips.

Because of a rotational speed of the filter, the illuminated sections "scroll" across the modulation chips, and modulation data energizing each pixel of the modulation chip is provided based on the frame rate of the video image being projected and whether the pixel is in a section illuminated by a left or right channel segment of filtered light (taking into account the scroll rate and filtered light bundle shape/dimensions, and hence the changing locations of left and right filtered sections scrolling across the modulating chips).

Figure 3B:
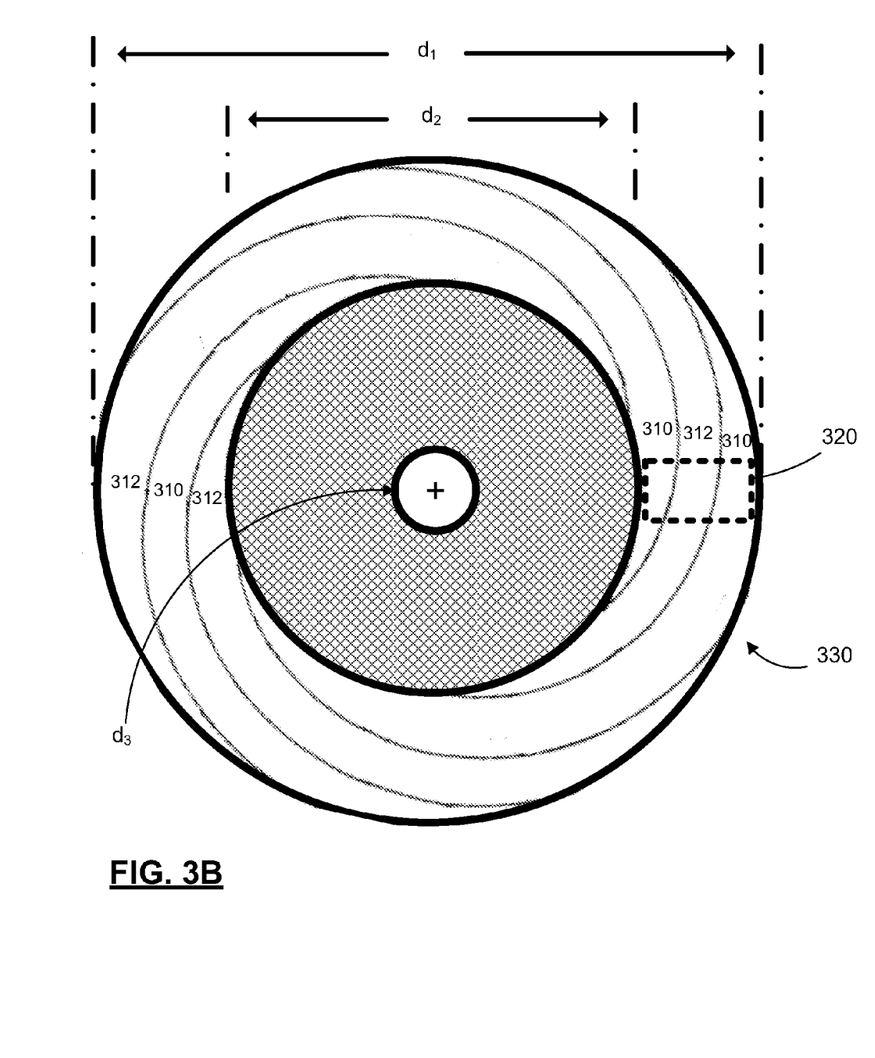
FIG. 3B illustrates variable diameter dimensions of a filter according to an embodiment of the present invention.

FIG. 3B illustrates variable diameter dimensions of a filter according to an embodiment of the present invention. A more efficiently produced filter utilizes less of the comparatively more expensive filter materials. A smaller dimension $d_1$ means a smaller filter overall and generally less filter material. Dimension $d_2$-$d_3$ provides a non-filter filler material that accounts for space between a perimeter of an attachment point of a rotating mechanism of a projector and an approximate beginning of the integrating rod output. The integrating rod output and filter material encompassing an area of approximately $d_1$-$d_2$. The diameter $d_3$ matching the rotating attachment point (and, depending on the projector design, matches the shape and characteristics of the attachment point for the projector). A filter wheel according to the present invention may be retro-fitted to existing projector designs by matching the attachment point and varying the amount of filter material (diameters $d_1$ and $d_2$) to cover the integrating rod output (or other light bundle within the optical path at the rotating mechanism).

Figure 3C:
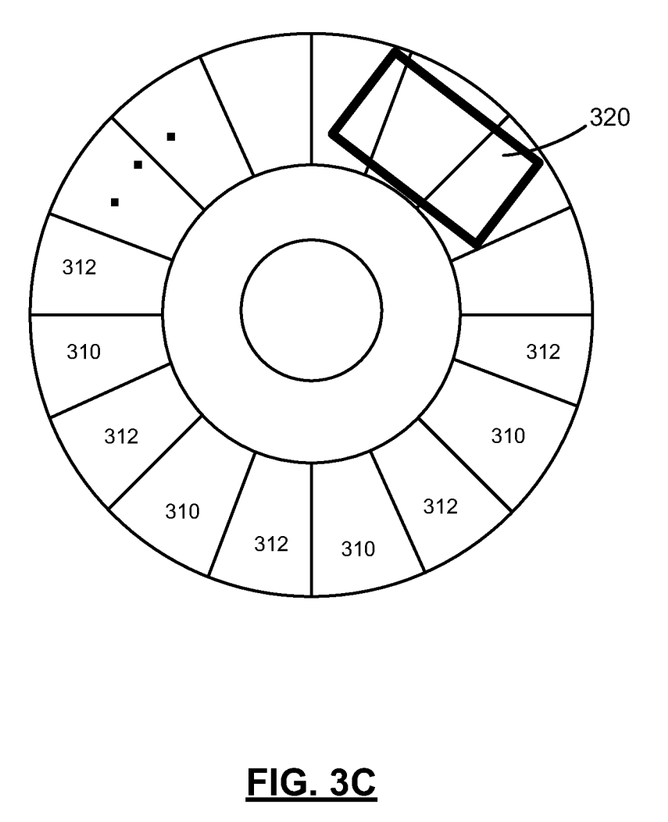
FIG. 3C illustrates a radially designed filter wheel according to an embodiment of the present invention.

FIG. 3C illustrates a radially designed filter wheel according to an embodiment of the present invention. As shown in FIG. 3C, the alternating filter sections 310 and 312 (corresponding to filters for right and left channels respectively) extend radially from a center of the filter wheel. The integrating rod output 320 is shown as being covered by approximately 2 filter sections (one full section, and one scrolling in section and one scrolling out section). However, the filter sections may be variable size with any number of sections (2 or more) being over the output at any given time. Other shapes for the filter sections may also be utilized along with corresponding changes in modulation data matching the channel of the filtered light that "scrolls" across the modulation surfaces.

Figure 4:
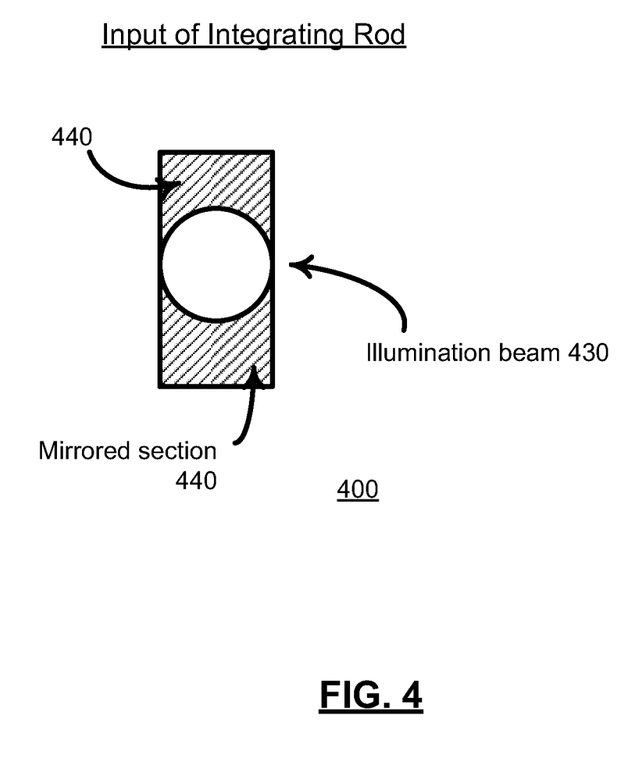
FIG. 4 is a drawing of an input end of an integrating rod according to an embodiment of the present invention.

FIG. 4 is a drawing of an input end of an integrating rod 400 according to an embodiment of the present invention. The integrating rod 400 includes a mirrored section 440 which reflects light. An illumination beam 430 is input light from, for example, lamphouse 110. In one embodiment, the mirrored section is a mirror at the input end of the light rod that re-reflects light that has been reflected upstream toward the input end of the integrating rod. The re-reflection directs the reflected light back towards the output end of the integrating rod (and further downstream toward the filter and modulator (s)). In another embodiment, the mirrored section also intercepts light from a light source (e.g., lamphouse 110) incident on the upstream side of the mirrored section which may then be reflected back into the lamphouse. Such reflections are intended to increase the efficiency of the light path.

Figure 5:
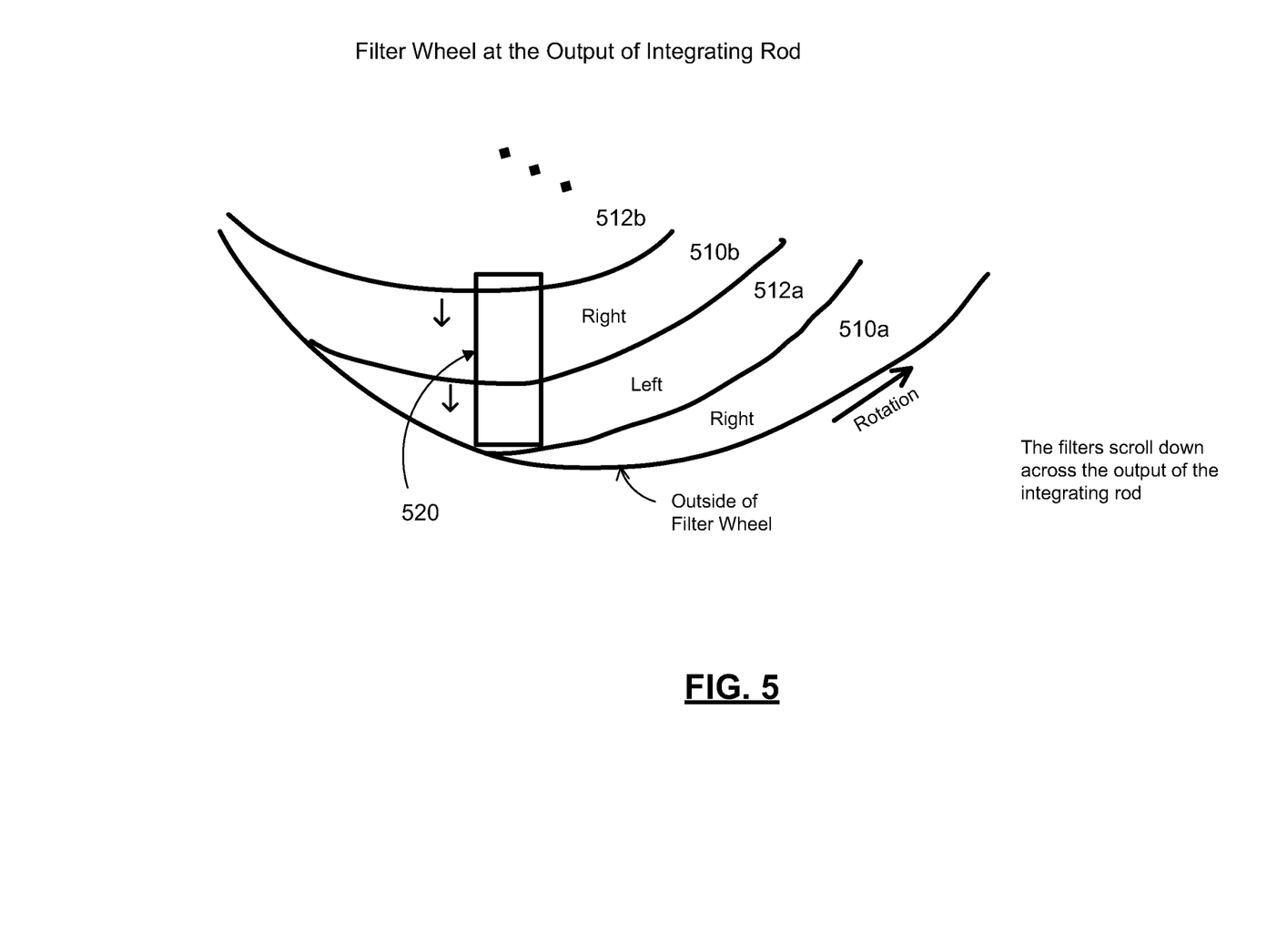
FIG. 5 is an illustration of left and right channel filtering according to an embodiment of the present invention.

FIG. 5 is an illustration of left and right channel filtering according to an embodiment of the present invention. A filter wheel 500 is illustrated as rotating in a counter-clockwise direction. Alternating sections of right channel filter (e.g., filter sections 510a, 510b, etc) and left channel filter (e.g., 512a, 512b, etc.) scroll across an integrating rod output 520, resulting in a light bundle whose cross-section includes segments of light which scroll over time (and include both left channel filtered light and right channel filtered light). The segmented light bundle then illuminates one or more modulation chips which modulate the segmented light bundle.

In the illustrated embodiment, both the left channel filter and right channel filter are present in the light path simultaneously, and the wheel rotates during the frame period. And, approximately ½ of the image of the wheel is left and ½ is right. The modulating chip formatting is modified such that a portion of the left image being modulated "scrolls" across the pixels of modulating surface. Modulation data for the left image corresponding to pixels of the modulating surface being illuminated with left channel filtered light energize the illuminated pixels. A similar process occurs for the right image and the right channel filtered light.

At least some of the light that is reflected from the left section of the color wheel that re-enters the integrating rod is reflected from the mirrors at the input of the integrating rod, and some of this reflected light passes through the right portion of the filter wheel, thus increasing the light that passes through the right channel over a non-reflecting configuration. At least some of the light that is reflected from the right section of the color wheel that re-enters the integrating rod is also reflected from the mirrors at the input of the integrating rod, and some of this reflected light passes through the left portion of the filter wheel, increasing the light that passes through the left channel over the non-reflecting configuration. Overall, these reflections ("light recycling") increases the light efficiency of the projection system.

Although FIG. 5 illustrates as having 3 active sections, a scrolling in section (e.g., 512b), a scrolling section (e.g., 510b), and a scrolling out section (e.g., 512a). In fact, any number of sections may be utilized by varying the width of the spirals (e.g., separate embodiments having 2, 3, 4, 5, 6, 7, or more sections of alternating or changing filter material specifications). Further, the spirals may be sized such that the integrating rod output is covered by 2 or more scrolling sections plus scrolling in and scrolling out sections. In one embodiment, the spiral widths are the same or approximately the same. In another embodiment, the spiral widths vary, and if implemented with varying widths, corresponding varying modulation data would also be provided to the illuminated light modulators.

In one embodiment, differences in illumination intensity between channels is compensated for by adjusting filter sizes. For example, if the intensity of light available for the left channel is lower than the intensity of light available for the right channel, the filter size of the left filter is increased until a better match is reached. Corresponding changes in programming for energizing the modulation chips is also provided (e.g., scrolling a larger portion of the left channel across the modulation surface in synchronization with the larger filter section passing through the light path).

As shown in FIG. 3A, the filter may accommodate various sizes of integrating rod outputs. The integrating rod output (e.g., 320/325) may, for example, be the entire end of the integrating rod or an output aperture. For better efficiency, the integrating rod output is, for example, shaped proportional to a size of the modulation surface of the modulation chips and a final image projected from the projection system.

In the illustrated embodiments, both left and right channel portions contain at least all three primary colors, and, using the exemplary filters, at least one channel includes more than one wavelength band in a same color (e.g., the right channel includes more than one band of blue light). However, other arrangements can be made based on the principles of the present invention including sequential red, green, and blue (or other primary and/or mixed color) images each containing both left and right channel wavebands simultaneously.

Figure 6:
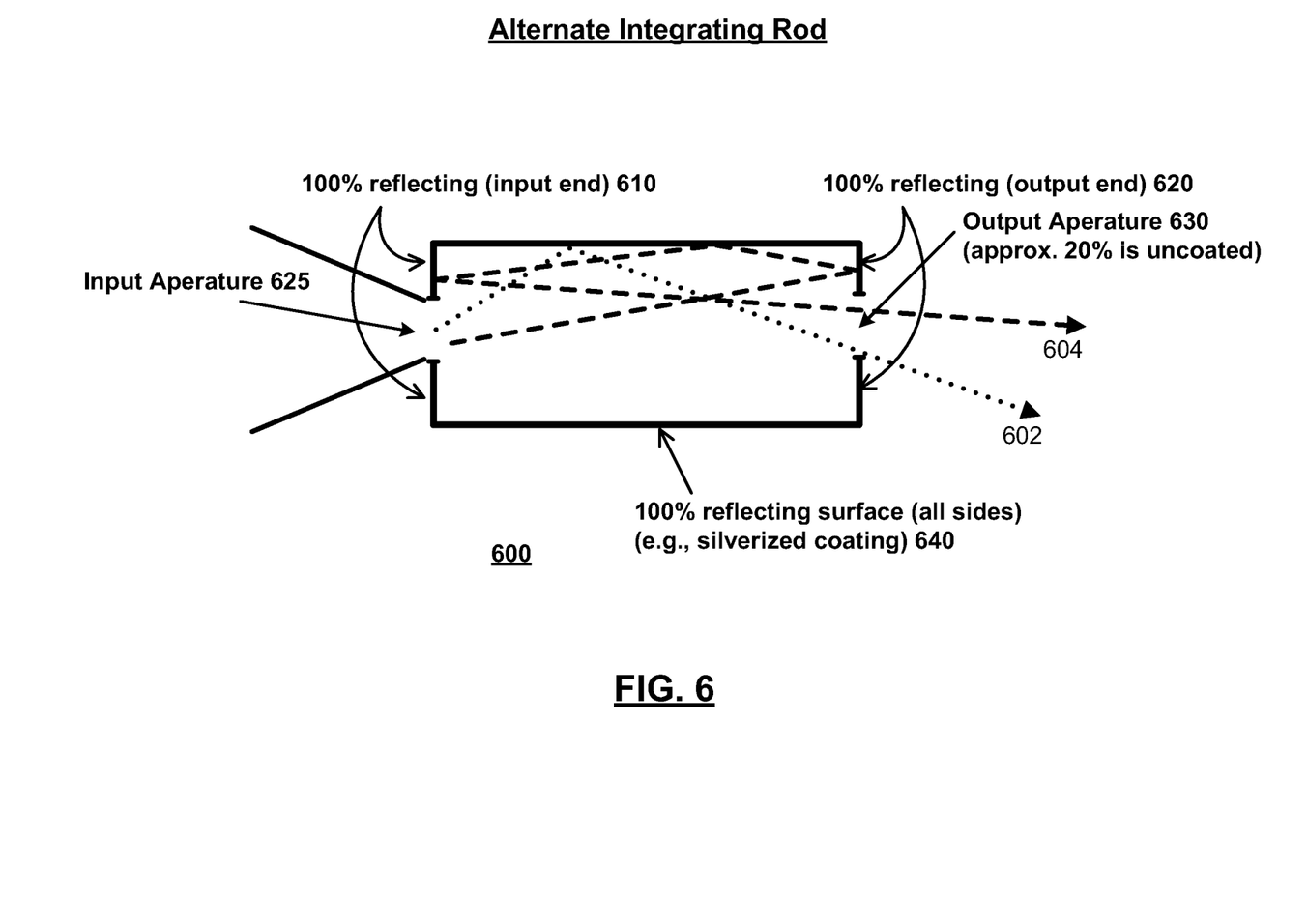
FIG. 6 is a drawing of an alternate integrating rod according to an embodiment of the present invention.

FIG. 6 is a drawing of an alternate integrating rod 600 according to an embodiment of the present invention. Mirrors are located at the portions of the input to the integrating rod that are not illuminated by the lamphouse. An input end of the integrating rod 600 includes a reflecting surface 610 (e.g., 100% reflecting surface) and an input aperture 625. The input end reflecting surface 610 may be configured as described above with reference to FIG. 4.

The integrating rod 600 also includes an output end reflecting surface 620 (e.g., 100% reflecting) and an output aperture 630. The output aperture is constructed by, for example, not coating the aperture with any reflecting material. The integrating rod body may be coated, for example, with a silverized or other material assuring near or equal to 100% internal reflection and little or no loss within the integrating rod.

The input aperture 625 allows light to enter the integrating rod. Two potential light paths are illustrated, a first path 602 reflecting off an interior of the integrating rod body and exiting the output aperture 630. The second path 604 reflects off the output end reflecting surface 620 and then internally reflects off the integrating rod body and the input end reflecting surface 610 and then on to a path that exits the output aperture. Any number or combination of reflections off the integrating rod body and/or the output end reflecting surface and/or the input end reflecting surface can occur prior to a light beam exiting the output aperture.

Figure 7:
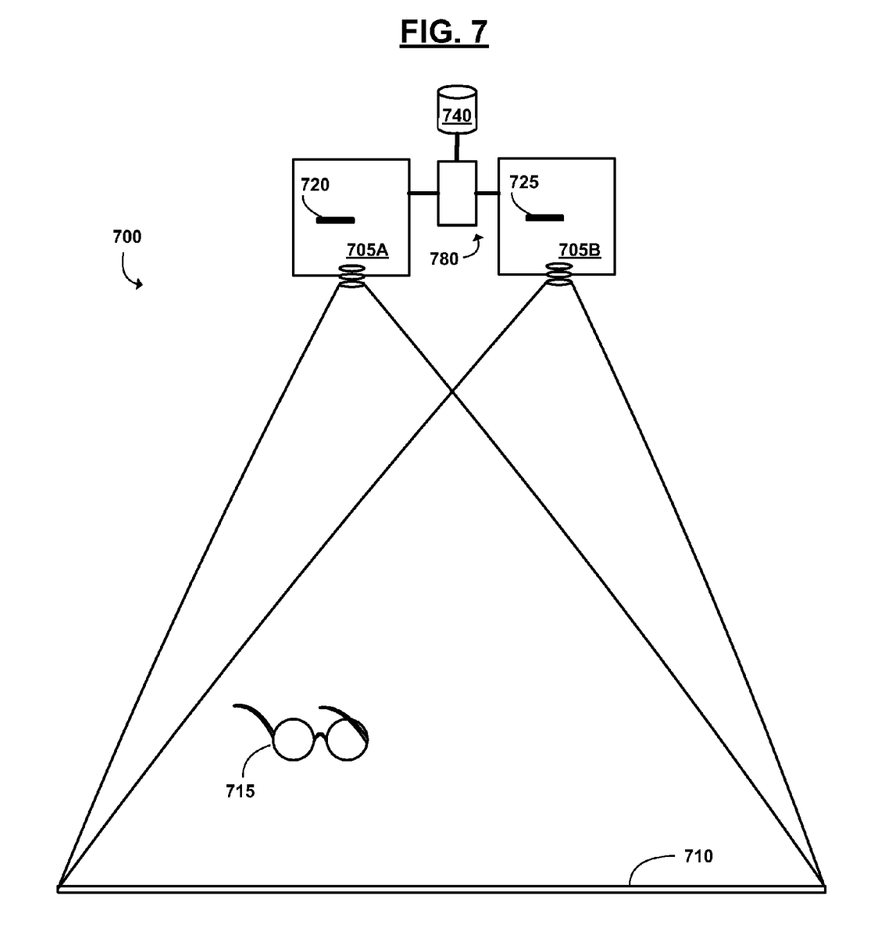
FIG. 7 is a drawing of a dual projector system according to an embodiment of the present invention.

FIG. 7 is a drawing of a dual projector system 700 according to an embodiment of the present invention. Left and right channel images are derived, decoded, retrieved, or reconstructed from data stored on disk drive 740 (or received from an appropriate network or transmission reception) by server 780. Color correction as described in the above noted patent applications may also be applied. The color correction, if utilized, is performed, for example, on a channel-by-channel basis and applied to the energizing data of the modulation chip in accordance with which pixels are illuminated by filtered light of the corresponding channel (e.g., pixels illuminated by left channel light have left channel color correction data applied).

The decoded, color corrected (if applicable), left and right channel images are then projected simultaneously and in part from a first projector 705A and a second projector 705B onto screen 710 for viewing through glasses 715. A projection filter 720 in the first projector has at least two passbands as described in any of the above embodiments. A projection filter 725 in the second projector has at least two passbands as described in any of the above embodiments. The light source of each projector is filtered by its projection filter and then illuminates modulators within the projector.

The illumination onto each modulator in both projectors comprises light with wavelengths from both a left and a right channel. The light filters (and modulators) of both projectors may be synchronized such that both projectors project identical images. However, in one embodiment, both the modulation chip energizing data and the filtered light illuminating pixels at a same corresponding locations in the separate projectors are inversely synchronized.

In a 3D left and right channel system, once the images from both projectors are combined, such inverse synchronization results in the production of full left and right images at any particular instance in time. Conversely, when the projected images are combined without inverse synchronization at a particular instance of time, only part of the image is present for each eye.

By way of further example, in inverse synchronization, half of the modulation surface of each modulator in one projector may be illuminated with left channel filtered light and pixels illuminated by the left channel filtered light are energized with modulation data for a left channel image. The other half of the modulation surface of each modulator is illuminated with right channel filtered light and the pixels so illuminated are energized with right channel image data. The modulators of the other projector are then inversely illuminated and energized. In result, if the 50% of the modulator being used for the left channel in one projector is the "top" half of the modulation surfaces, then the other projector utilizes the "bottom" half of its modulation surfaces for the left channel. The same relationship exists between channels when the modulation surfaces are broken down into more parts, where, for example, 2 or more sections of "scrolling" left channel filtered light illuminate 2 or more "scrolling" sections of a modulation surface and are side-by-side to 1 or more sections of "scrolling" right channel filtered light (sections of the modulators in one projector being illuminated and energized according to a left channel are illuminated and energized according to a right channel in the other projector).

Regardless of the percentage of modulation surface being used by a particular channel, in an inverse synchronization arrangement, it is the sum of the images from both projectors that creates the full images for each channel (a workable system results when, for example, 25% of the modulation surfaces of one projector are used by the left channel—the other projector utilizes 75% of its modulation surfaces to modulate the remainder of the left channel image). The inverse synchronization may be accomplished, for example, by different relative positions of the filters in each projector and providing appropriate modulation data to each modulator.

Such a system is a dual projector active system, wherein the active portion is the inversely synchronized left and right channel "scrolling." Typically, without inverse synchronization a scrolling rate 2 or more scrolls per frame is needed to reduce flicker to acceptable levels. However, inverse synchronization reduces flicker, allowing the use of a slower left/right channel scrolling rate (e.g., a single scroll per frame may be utilized) and the slower scrolling rate also requires less switching in the modulators.

Glasses 715 include left and right channel viewing filters respectively disposed on left and right lenses of the glasses. The viewing filters are, for example, passbands that encompass each passband of a corresponding channel in the projection filters.

Figure 8:
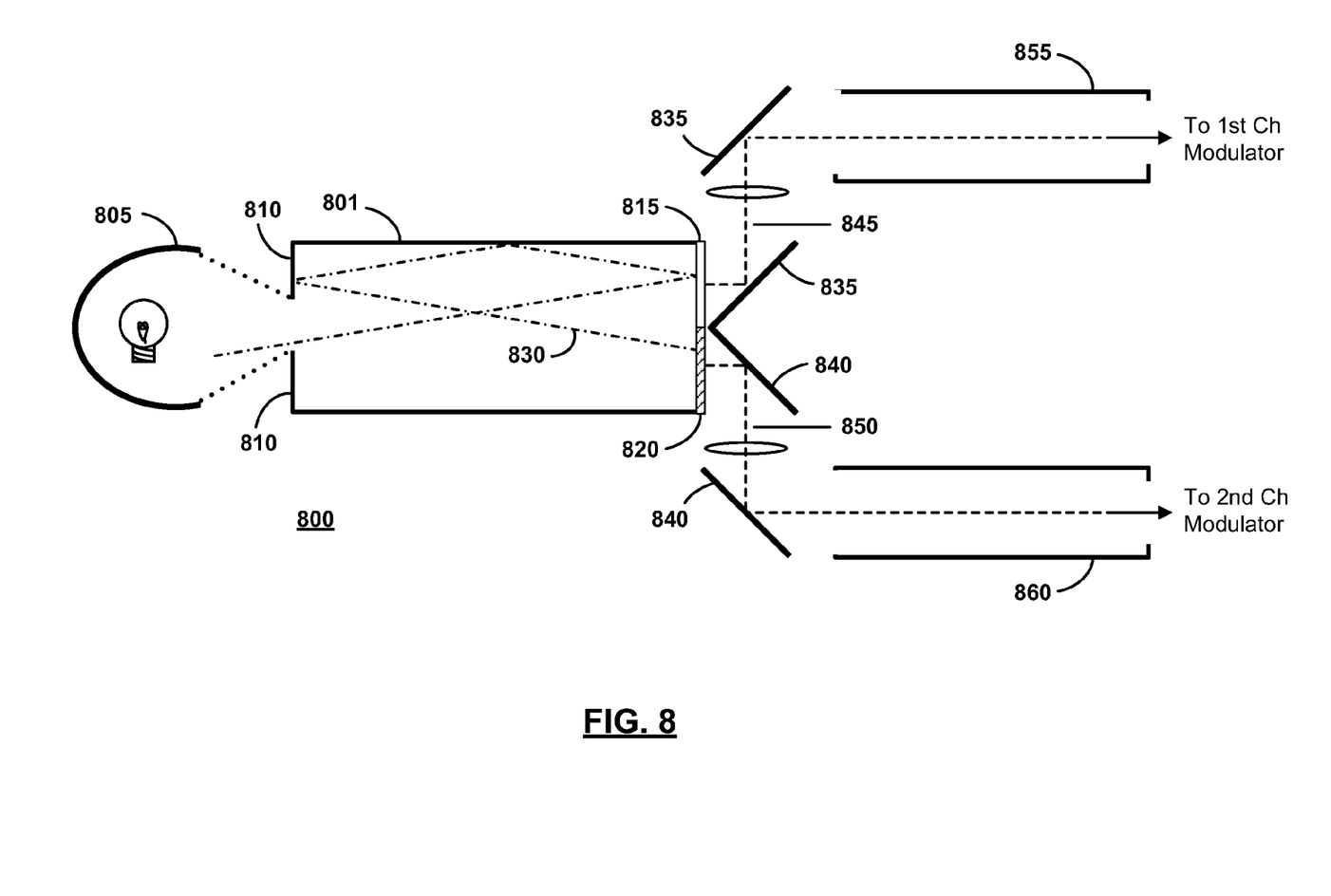
FIG. 8 is a drawing of non-rotating light re-cycling system according to an embodiment of the present invention.

FIG. 8 is a drawing of non-rotating light re-cycling system 800 according to an embodiment of the present invention. An integrating rod 801 is illuminated by a light source (e.g., lamphouse) 805. An input aperture is surrounded by mirror 810. A first channel filter 815 and a second channel filter 820 are positioned at an output (e.g., an output aperture) of the integrating rod. Reflections from either the first channel filter 815 or the second channel filter 820 are "recycled" by further reflection off mirror 810 and/or the sides of the integrating rod.

The reflected light has the opportunity to pass through the channel filter opposite the channel filter that reflected it back towards mirror 810 (e.g., light beam 830 was initially reflected toward mirror 810 by the first channel filter 815 and was reflected multiple times within the integrating rod, including off mirror 810, and then exited the integrating rod through the second channel filter 820). Light that fails to strike a passable channel filter is reflected again providing yet another opportunity to pass the/an appropriate channel filter.

Light passed by the first channel filter 815 then follows a path (e.g., reflection via mirrors 835 through $2^{nd}$ integrating rod 855) to modulators for the first channel. Light passed by the second channel filter 820 follows a path (e.g., reflection via mirrors 840, through $3^{rd}$ integrating rod 860) to modulators for the second channel. The modulators are for example, 3 chip DLPs. The modulators, for example, respectively modulate left and right images of a 3D image.

In a single projector system utilizing the non-rotating light re-cycling system, the left and right modulated images are recombined and then projected through a projection lens onto a screen for viewing. For example, ½ of the modulation chip is used for modulating the left channel image and the other ½ of the modulator is used to modulate the right channel image. Optics similar to those used in "dual strip" film projectors are then utilized to combine the left and right channel light paths into a single 3-D light path.

As with other embodiments described herein, the projection onto the screen is, for example, either a rear or front projection configuration. Alternatively, separate projection lenses may be configured for the left and right channels individually. A dual projection system utilizing the non-rotating light re-cycling system would utilize two projectors respectively projecting left and right channel images simultaneously onto the same screen for increased brightness.

Although the present invention has been described herein with reference to projectors using DLP modulators, other modulator types, including LCoS may be utilized. In describing preferred embodiments of the present invention, specific terminology is employed for the sake of clarity. However, the present invention is not intended to be limited to the specific terminology so selected, and it is to be understood that each specific element includes all technical equivalents which operate in a similar manner. Furthermore, the inventor recognizes that newly developed technologies not now known may also be substituted for the described parts and still not depart from the scope of the present invention. All other described items, including, but not limited to integrating rods, mirrors, filters, etc should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings described herein, including, but not limited to, decoding video and preparing frame data for modulation, color processing, synchronizing filters, simultaneously energizing modulation chips with "scrolling" left and right channel image data, timing and synchronization of images projected in dual projection systems, matching scrolling modulation data to variable filter sizes, and the display, storage, or communication of results according to the processes of the present invention.

The present invention may suitably comprise, consist of, or consist essentially of, any element (the various parts or features of the invention) and their equivalents. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A 3D display system, comprising:
    a projector system comprising a first channel projection system and a second channel projection system;
    the first channel projection system comprising optics forming a first channel light path and a first channel modulation device configured to modulate a first channel spectrum of different color lights delivered to the modulator via the first channel light path;
    the second channel projection system comprising optics forming a second channel light path and a second channel modulation device configured to modulate a second channel spectrum of different color lights delivered to the modulator via the second channel light path;
    a first channel spectrum separator configured to separate spectrum outside the first channel spectrum of different color lights and prevent the separated spectrum outside the first channel spectrum from entering the first channel light path;
    a second channel spectrum separator configured to separate spectrum outside the second channel spectrum of different color lights and prevent the separated spectrum outside the second channel spectrum from entering the second channel light path; and
    recycling optics configured to re-direct spectrum by the first channel spectrum separator toward the second channel spectrum separator and visa versa;
    viewing glasses comprising a first channel viewing filter comprising passbands corresponding to the first channel spectrum and blocking bands corresponding to the second channel spectrum and a second channel viewing filter comprising passbands corresponding to the first channel spectrum and blocking bands corresponding to the second channel spectrum;
    wherein an endpoint of a passbands of one of the first and second viewing filters is shifted relative to the spectrum of its corresponding channel.

2. The 3D display system according to claim 1, wherein the first channel spectrum of different color lights comprises a first set of red, green, and blue color lights; and the second channel spectrum of different color lights comprises a second set of red, green, and blue color lights each different and separated from the first set of red, green, and blue lights.

3. The 3D display system according to claim 1, wherein the lights of the first and second channel spectrums comprise narrowband lights.

4. The 3D display system according to claim 1, wherein the lights of the first and second channel spectrums comprise narrowband green and blue lights having a full width half max of approximately less than 25 nm.

5. The 3D display system according to claim 4, wherein one of the first and second channel spectrums comprise at least one of more green color narrowband lights and more blue color narrowband lights than the other channel spectrum.

6. The 3D display system according to claim 1, wherein the first channel projection system comprises a first projector and the second channel projection system comprises a second projector.

7. The 3D display system according to claim 6, wherein the projectors comprise cinema projectors.

8. The 3D display system according to claim 6, wherein the first modulator of the first projector comprises a first 3-chip modulator and the second modulator of the second projector comprises a second 3-chip modulator.

9. The 3D display system according to claim 6, wherein:
    the first and second projector share a common lamphouse configured to produce light separable into the first channel spectrum and the second channel spectrum, the first and second modulators comprise a first 3-chip modulator and a second 3-chip modulator;
    the first and second channel spectrums comprise narrowband lights comprising a plurality of colors including narrowband green and blue colors having a full width at half max of less than approximately 25 nm;
    the projection system further comprising viewing glasses comprising a curved first channel viewing filter comprising passbands corresponding to the first channel spectrum and blocking bands corresponding to the second channel spectrum and a curved second channel viewing filter comprising passbands corresponding to the first channel spectrum and blocking bands corresponding to the second channel spectrum and a plurality of passbands of the viewing glasses comprising endpoints that are adjacent and shifted from corresponding channel spectrums that the passbands are configured to pass.

10. The 3D display system according to claim 1, wherein the first modulator comprises a first 3-chip modulator and the second modulator comprises a second 3-chip modulator.

11. The 3D display system according to claim 10, wherein the 3-chip modulators comprise at least one of a 3-chip DLP modulator and a 3-chip LCoS modulator.

12. The 3D display system according to claim 1, wherein the viewing filters are curved.

13. The 3D display system according to claim 1, wherein the passbands of each viewing filter encompass the spectrum of its corresponding channel.

14. The 3D display system according to claim 1, wherein the first channel spectrum separator and the second channel spectrum separator each comprise reflective filters respectively configured on first and second halves of a wheel synchronized with images produced by the modulators.

15. The 3D display system according to claim 14, wherein the modulators are inversely synchronized such that the first channel modulator is configured to modulate a first eye image in first channel spectrum provided by the first channel spectrum separator and the second channel modulator is configured to modulate a second eye image in second channel spectrum provided by the second channel spectrum separator during a first time period, and the first channel modulator is configured to modulate a second eye image in second channel spectrum provided by the second channel spectrum separator and the second channel modulator is configured to modulate a first eye image in first channel spectrum provided by the first channel spectrum separator during a second time period.

16. The 3D display system according to claim 15, further comprising viewing glasses comprising a curved first channel viewing filter comprising passbands corresponding to the first channel spectrum and blocking bands corresponding to the second channel spectrum and a curved second channel viewing filter comprising passbands corresponding to the first channel spectrum and blocking bands corresponding to the second channel spectrum and at least one passband of the viewing glasses comprises an endpoint adjacent and shifted from its corresponding channel spectrum.

17. A 3D display system, comprising:
   a projector system comprising a first channel projection system and a second channel projection system;
   the first channel projection system comprising optics forming a first channel light path and a first channel modulation device configured to modulate a first channel spectrum of different color lights delivered to the modulator via the first channel light path;
   the second channel projection system comprising optics forming a second channel light path and a second channel modulation device configured to modulate a second channel spectrum of different color lights delivered to the modulator via the second channel light path;
   a first channel spectrum separator configured to separate spectrum outside the first channel spectrum of different color lights and prevent the separated spectrum outside the first channel spectrum from entering the first channel light path;
   a second channel spectrum separator configured to separate spectrum outside the second channel spectrum of different color lights and prevent the separated spectrum outside the second channel spectrum from entering the second channel light path; and
   recycling optics configured to re-direct spectrum by the first channel spectrum separator toward the second channel spectrum separator and visa versa;
   viewing glasses comprising a first channel viewing filter comprising passbands corresponding to the first channel spectrum and blocking bands corresponding to the second channel spectrum and a second channel viewing filter comprising passbands corresponding to the first channel spectrum and blocking bands corresponding to the second channel spectrum;
   wherein the passbands of the viewing glasses are shifted relative to the spectrum of its corresponding channel.

18. The 3D display system according to claim 17, wherein one of the first and second channel spectrums comprises at least one of more green color lights and more blue color lights than the other channel spectrum.

19. The 3D display system according to claim 17, wherein the viewing filter passbands are blue shifted relative to the spectrum of light in its corresponding channel.

20. The 3D display system according to claim 19, wherein the viewing filters are curved.

* * * * *